Nov. 29, 1960   F. KOPIETZ   2,961,994

DEVICE FOR FEEDING FISH

Filed June 8, 1959

INVENTOR.
FRANK KOPIETZ
BY Louis Chayka
ATTORNEY

United States Patent Office 2,961,994
Patented Nov. 29, 1960

2,961,994

DEVICE FOR FEEDING FISH

Frank Kopietz, 22429 Colony Ave.,
St. Clair Shores, Mich.

Filed June 8, 1959, Ser. No. 818,903

4 Claims. (Cl. 119—51)

The invention pertains to means whereby suitable food may be supplied to fish in land locked bodies of water such as ponds or small lakes. This becomes necessary in cases where the fish multiply to such an extent that food naturally available under such conditions has become too scant to sustain them.

To remedy this situation it is customary to supply the fish with suitable food, such as ground meat or fish, which food is thrown in the water. As a result, particles of food of higher specific gravity than water will sink to the bottom where they may be wasted.

It is in order to remedy such a situation that I have devised my invention which includes a compacted food element and a carrier for its support, the whole to be immersed in water at a desired level beneath its surface.

I shall now describe my invention with reference to the accompanying drawings in which.

Similar numerals refer to similar parts throughout the several views.

Figure 1:
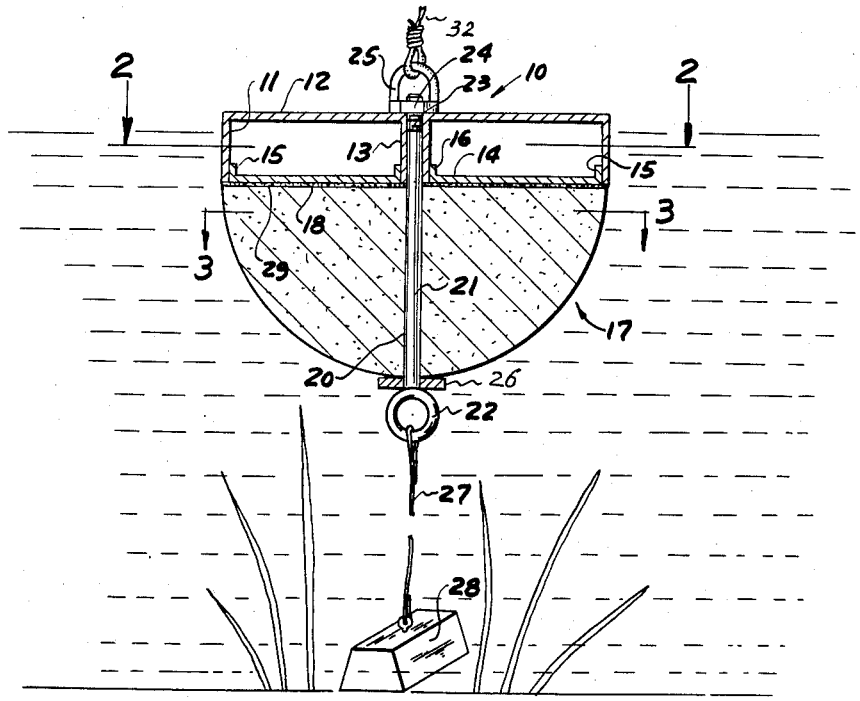
Fig. 1 is a side elevational view, partly in section, of a food carrier and a quantity of food supported thereby.
Figure 2:
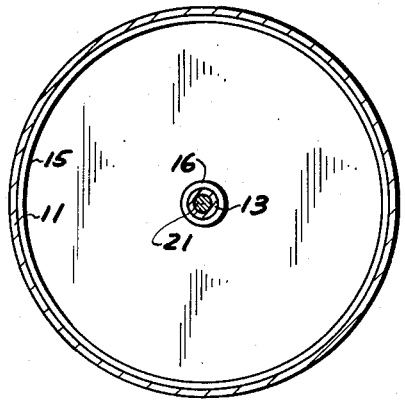
Fig. 2 is a sectional view on line 2—2 of Fig. 1.
Figure 3:
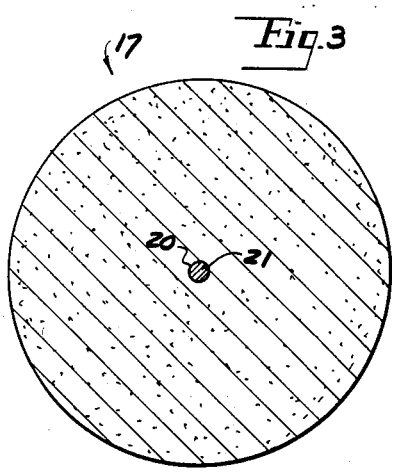
Fig. 3 is a sectional view on line 3—3 of Fig. 1.

The device includes a float 10 which may be made of any suitable material such as sheet metal or plastic. In its preferred form, the float has the shape of a hollow drum defined by a circular wall 11, a bottom 14 and a flat top 12 which at its central portion includes an integrally formed, downwardly extending bushing 13. The bottom 14 which is also flat includes an upwardly turned marginal flange 15 for a tight, waterproof fit with the inner surface of the circular wall 11. In addition the bottom 14 has a centrally located aperture encircled by a bead 16, said bead fitting tightly about the lower portion of said bushing 13.

Cemented to the lower surface of the float 10 shown in Fig. 1 is a cake of compacted food which generally is indicated by numeral 17. The cake is semispherical in shape and is defined in part by a flat circular surface 18 which is of the same diameter as the float 10. For a purpose which will be presently explained, the cake is provided with a hole 20 located centrally in the circular flat surface 18 of said cake, and extending at right angle therefrom to the outer surface thereof.

The flat surface 18 of the cake is coated with a waterproof cementitious material 29 whereby the cake is bonded to the undersurface of the float as shown in Fig. 1.

The food of which the cake is made may consist of particles of any suitable substance or a number of substances, and may include particles of meat, fish, and cereals, compacted into a solid form. If needed a bonding medium may be used preferably of such nature that it will prevent rapid disintegrations of the form into which the particles have been compressed. As the specific contents of the food cake are of no inventive character, detailed description of such ingredients is not deemed necessary.

Thrust through the hole 20 in said cake 17 from below, and extending through the bushing 13, is a shaft 21 which at its lower end terminates with an eye 22. The upper or the opposite end of the shaft, projects above the top wall 12 of the float and is threaded as shown at 23 for reception of a nut 24. The latter is made with an inverted U-shaped loop 25 for connection to a cord 32 by means of which the device may be suspended from above. If desirable, a small washer 26 may be placed between the eye 22 and the lower portion of the semi-spherical food cake 17 for support of said cake from below. Attached to the eye 22 is a cord 27 which at its opposite end is tied to a sinker 28.

Figure 4:
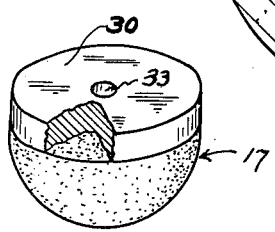
Fig. 4 is a perspective view of a modified device, a part of the component element of the device being broken off to better disclose its nature.

In the modified species shown in Fig. 4 the float 30 is made of a solid piece of wood or cork or some other substance, the specific gravity of which is less than that of water. The float contains a hole 33 for reception of a shaft such as shaft 21. The food cake 17 in this modified species is of the same kind as that shown in Fig. 1 and is secured similarly to the float.

After having described my device, I wish to claim the following:

1. A fish feeding device including a float having a flat bottom, a fish food cake cemented to the undersurface of said float, and a shaft axially passing through both the float and the cake immovably secured thereto and having means at each end for attachment to a cord, said food cake when immersed adapted to slowly release particles of food.

2. A fish feeding device including a float having a flat bottom and provided with a vertical aperture extending from the top to the bottom of said float, a food cake for fish defined, in part, by a flat surface and cemented at said surface to the bottom of the float, the cake having an aperture in register with the aperture in said float, and a shaft passing through both apertures, one end of the shaft projecting over the top of the float and the other end projecting beneath the undersurface of the food cake, said shaft being secured to said float and food cake, and an eye at each end of the shaft for attachment to a cord, said food cake when immersed adapted to slowly release particles of food.

3. A fish feeding device including a hollow, drum-shaped float defined, in part, by a circular flat bottom, a fish food cake in the shape of a solid hemisphere defined, in part, by a circular flat surface of a diameter substantially equal to that of the drum, said flat surface being in abutment with said flat bottom of the float and cemented thereto, and a shaft passing axially through the float and the cake, and secured thereto, each end of the shaft including means for attachment to a cord, said food cake when immersed adapted to slowly release particles of food.

4. A fish feeding device including a hollow, drum-shaped float having a flat bottom, the float having an axial bushing extending from the top to the bottom thereof, a semi-spherical cake of fish food cemented to the underside of the float, the cake having a vertical aperture in register with the bushing in the float, and a shaft passing through said bushing and through said aperture in the cake, the shaft extending through the bushing upwardly over the top of the float and downwardly beneath the surface of the cake, one end of the shaft being provided with an eye, the other end being threaded for reception of a nut, said shaft being secured to said float and food cake, said food cake when immersed adapted to slowly release particles of food.

References Cited in the file of this patent

UNITED STATES PATENTS

| | | |
|---|---|---|
| 1,791,175 | Tomlinson | Jan. 24, 1929 |
| 2,283,472 | Tuxhorn | May 19, 1942 |
| 2,306,312 | Hyde | Dec. 22, 1942 |
| 2,571,275 | Meaker | Oct. 16, 1951 |
| 2,612,718 | Steinberg | Oct. 7, 1952 |

FOREIGN PATENTS

| | | |
|---|---|---|
| 1,017,646 | France | Sept. 24, 1952 |
| 1,054,574 | France | Oct. 7, 1953 |